(12) United States Patent
Uchida

(10) Patent No.: US 7,921,305 B2
(45) Date of Patent: Apr. 5, 2011

(54) PORTABLE INFORMATION TERMINAL AND DATA PROTECTING METHOD

(75) Inventor: Motoyuki Uchida, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1258 days.

(21) Appl. No.: 11/346,291

(22) Filed: Feb. 3, 2006

(65) Prior Publication Data

US 2006/0190729 A1  Aug. 24, 2006

(30) Foreign Application Priority Data

Feb. 23, 2005  (JP) .................. 2005-047860

(51) Int. Cl.
*G06F 12/00*  (2006.01)
(52) U.S. Cl. ......... 713/194; 713/168; 380/247; 709/223
(58) Field of Classification Search ........................ None
See application file for complete search history.

(56) References Cited

U.S. PATENT DOCUMENTS

| | | | |
|---|---|---|---|
| 5,737,415 A | 4/1998 | Akiyama et al. | |
| 6,658,566 B1 | 12/2003 | Hazard | |
| 6,725,379 B1 | 4/2004 | Dailey | |
| 2002/0013772 A1 | 1/2002 | Peinado | |
| 2002/0176580 A1 * | 11/2002 | Horiuchi et al. | 380/270 |
| 2002/0184154 A1 * | 12/2002 | Hori et al. | 705/50 |
| 2005/0027844 A1 | 2/2005 | Hariprasad et al. | |

FOREIGN PATENT DOCUMENTS

| | | |
|---|---|---|
| EP | 1 501 330 A2 | 1/2005 |
| JP | 09 215057 | 8/1997 |
| JP | 10-065662 | 3/1998 |
| JP | 2003-143131 | 5/2003 |
| JP | 2005-039864 | 2/2005 |
| WO | WO 98/27494 | 6/1998 |

OTHER PUBLICATIONS

Chinese Patent Office Action with English translation, Application No. 200610008867.7. NTT Docomo,Inc. Sep. 12, 2008 (Filed with IDS on Nov. 28, 2008).*

* cited by examiner

*Primary Examiner* — Taghi T. Arani
*Assistant Examiner* — Amir Mehrmanesh
(74) *Attorney, Agent, or Firm* — Oblon, Spivak, McClelland, Maier & Neustadt, L.L.P.

(57) ABSTRACT

Even if a portable information terminal is lost or stolen, a third party is prevented from illegally browsing data stored in the portable information terminal. When a control signal is received through wireless communication part and when the received control signal is an instruction signal to execute an encryption process on plaintext data stored in data memory, the plaintext data is encrypted and encrypted data is stored in the data memory. Thereafter, erasing part erases the plaintext data stored in the data memory.

4 Claims, 12 Drawing Sheets

Fig.3

| DATA TYPE | ALGORITHM TYPE | KEY DATA | AVAILABILITY OF REPRODUCTION | SERVER ACCESS |
|---|---|---|---|---|
| ADDRESS BOOK | ALGORITHM A | 123456789 | PERMITTED | UNNECESSARY |
| MAIL | ALGORITHM A | 123456789 | PERMITTED | UNNECESSARY |
| . | . | . | . | . |
| . | . | . | . | . |
| RINGING MELODY | ALGORITHM B | INFORMATION X | PERMITTED | AUTHENTICATION |
| STILL IMAGE | ALGORITHM C | INFORMATION Y | PERMITTED | AUTHENTICATION |
| MOTION IMAGE | PLAYER | INFORMATION Z | PERMITTED | REPRODUCTION AVAILABILITY CHECK |

PORTABLE INFORMATION TERMINAL AND DATA PROTECTING METHOD

BACKGROUND OF THE INVENTION

1. Field of the Invention

The present invention relates to a portable information terminal storing user data such as an address book, and a data protecting method.

2. Related Background Art

There are portable information terminals (personal digital assistants) devised in such a configuration that when a user loses a portable information terminal such as mobile equipment or when it is stolen, a remote control is performed to effect manipulation locking to prevent third party's use, or to erase stored data. For example, Japanese Patent Application Laid-Open No. 2003-319453 (hereinafter referred to as "Document 1") describes a portable communication terminal configured to effect dial locking on the basis of a setting condition or to erase data, thereby prohibiting calling with the portable communication terminal or preventing browsing of personal information.

SUMMARY OF THE INVENTION

However, the dial locking method in the portable communication terminal described in Document 1 required the user to carry out a setting work for implementing the dial locking in advance in the portable communication terminal. In addition, it was unable to perfectly prevent forced readout, for example, by dumping the data stored in the portable communication terminal, and was thus unable to prevent unauthorized data browsing. The method of erasing the data is effective in preventing the forced readout of the data, but, after the lost or stolen terminal was found, it was difficult to restore the data to an original state.

An object of the present invention is therefore to provide a portable information terminal and a data protecting method capable of preventing a third party from illegally browsing data stored in the portable information terminal even if the portable information terminal is lost or stolen, and capable of readily restoring the data to an original state after the portable information terminal is found.

In order to solve the above problem, a portable information terminal according to the present invention is one comprising: data storing means for storing plaintext data; receiving means for receiving a control signal through wireless communication; encrypting means for, when the control signal received by the receiving means is an instruction signal to execute an encryption process on the plaintext data stored in the data storing means, encrypting the plaintext data stored in the data storing means and storing encrypted data resulting from the encryption process, in the data storing means; and erasing means for erasing the plaintext data from the data storing means after the encrypting means has encrypted the plaintext data stored in the data storing means.

A data protecting method according to the present invention is a data protecting method in a portable information terminal with data storing means for storing plaintext data, comprising: a receiving step of receiving a control signal through wireless communication; an encrypting step of, when the control signal received in the receiving step is an instruction signal to execute an encryption process on the plaintext data stored in the data storing means, encrypting the plaintext data stored in the data storing means and storing encrypted data resulting from the encryption process, in the data storing means; and an erasing step of erasing the plaintext data from the data storing means after the plaintext data stored in the data storing means has been encrypted in the encrypting step.

According to the present invention, when a control signal is received and when the received control signal is determined to be an instruction signal to execute the encryption process of plaintext data stored, the encryption process is carried out on the plaintext data stored, the encrypted data resulting from the encryption process is stored, and the plaintext data is erased. This can prevent a third party from browsing the stored data, for example, if the portable information terminal is lost or stolen. When compared with the technology of locking the manipulation of the portable information terminal, the plaintext data is not stored in a browsable state and therefore security can be enhanced against third party's browsing of the plaintext data. When compared with the case of deleting the data, the encryption process is performed to store the plaintext data in the form of the encrypted data, and therefore it is also easy to perform a process for recovering the plaintext data from the encrypted data. The plaintext data is data before encrypted.

Another portable information terminal according to the present invention is one comprising: data storing means for storing plaintext data or encrypted data; acquiring means for acquiring right information necessary for an encryption process of the plaintext data stored in the data storing means, and for a decryption process of the encrypted data stored in the data storing means; encrypting means for encrypting the plaintext data stored in the data storing means, using the right information acquired by the acquiring means, and for storing the encrypted data resulting from the encryption process, in the data storing means; erasing means for erasing the plaintext data stored in the data storing means, after the encrypting means has stored the encrypted data in the data storing means; right information storing means for, when the acquiring means acquires the right information, validating and storing the acquired right information; and decrypting means for enabling the decryption process of the encrypted data using the right information when the right information is validated, with reception of a reproduction instruction to reproduce the encrypted data obtained by the encrypting means.

Another data protecting method according to the present invention is a data protecting method in a portable information terminal with data storing means for storing plaintext data or encrypted data, and right information storing means for storing right information necessary for encrypting the plaintext data stored in the data storing means, or for decrypting the encrypted data, comprising: an acquiring step of acquiring the right information necessary for an encryption process of the plaintext data stored in the data storing means, and for a decryption process of the encrypted data stored in the data storing means; an encrypting step of encrypting the plaintext data stored in the data storing means, using the right information acquired in the acquiring step, and storing the encrypted data resulting from the encryption process, in the data storing means; an erasing step of erasing the plaintext data stored in the data storing means, after the encrypted data has been stored in the data storing means in the encrypting step; a storing step of, when the right information is acquired in the acquiring step, validating the acquired right information and storing the right information in the right information storing means; and a decrypting step of enabling the decryption process of the encrypted data using the right information when the right information stored in the right information storing means is valid, with issuance of a reproduction instruction to reproduce the encrypted data resulting from the encryption in the encrypting step.

According to the present invention, the right information is acquired which is necessary for the encryption process of plaintext data and for the decryption process of encrypted data, the plaintext data is encrypted based on the acquired right information, the encrypted data is stored, the plaintext data before the encryption is erased, and the acquired right information is validated and stored. When the right information is validated, the decryption process is enabled to permit execution of reproduction of the encrypted data. This enables the plaintext data to be encrypted using the right information and permits the decryption process of encrypted data when the right information is validated, with issuance of a reproduction instruction to reproduce the encrypted data. Therefore, the third party's data browsing can be restricted by simply performing a setting work of invalidating the right information. Therefore, a third party can be prevented from browsing the stored data even if the portable information terminal is lost or stolen. When compared with the technology of locking the manipulation of the portable information terminal, the plaintext data is not stored in a browsable state and therefore security can be enhanced against third party's browsing of the plaintext data. When compared with the case of deleting the data, the encryption process is performed to store the plaintext data in the form of the encrypted data and therefore it is also easy to perform a process of recovering the plaintext data from the encrypted data.

Another portable information terminal according to the present invention is one comprising: data storing means for storing encrypted data; right information storing means for storing right information necessary for a decryption process of the encrypted data stored in the data storing means; decrypting means for, when the right information stored in the right information storing means is valid, with issuance of a reproduction instruction to reproduce the encrypted data stored in the data storing means, executing the decryption process on the encrypted data stored in the data storing means, using the right information and for, when the right information stored in the right information storing means is invalid, avoiding executing the decryption process on the encrypted data stored in the data storing means, using the right information; and reproducing means for reproducing plaintext data resulting from the decryption process by the decrypting means.

Another data protecting method according to the present invention is a data protecting method in a portable information terminal with data storing means for storing encrypted data, and right information storing means for storing right information necessary for a decryption process of the encrypted data stored in the data storing means, comprising: a decrypting step of, when the right information stored in the right information storing means is valid, with issuance of a reproduction instruction to reproduce the encrypted data stored in the data storing means, executing the decryption process on the encrypted data stored in the data storing means, using the right information, and, when the right information stored in the right information storing means is invalid, avoiding executing the decryption process on the encrypted data stored in the data storing means, using the right information; and a reproducing step of reproducing plaintext data resulting from the decryption process in the decrypting step.

According to the present invention, when the right information is valid, with issuance of an instruction to reproduce encrypted data stored in advance, the encrypted data is decrypted according to the right information preliminarily stored, to obtain plaintext data, and the plaintext data obtained can be reproduced. This permits the encrypted data to be reproduced according to user's manipulation. Furthermore, since reproduction of data is permitted with the right information being valid, third party's data browsing can be prevented by invalidating the right information even if the portable information terminal is lost or stolen.

The portable information terminal of the present invention is preferably configured as follows: the right information storing means further stores as the right information, whether reproduction of the encrypted data is enabled, for each data type; and the decrypting means executes the decryption process if that the reproduction of data is enabled is stored for a data type of the encrypted data to be reproduced, and the decrypting means avoids the decryption process if that the reproduction of data is disabled is stored.

According to the present invention, the availability of reproduction of encrypted data can be stored as the right information for each data type, and thus meticulous management can be performed for each data type.

The portable information terminal of the present invention is preferably configured as follows: it comprises authenticating means for performing an authentication process through communication with a server for performing authentication of the portable information terminal, with issuance of a reproduction instruction to reproduce data stored in the data storing means; and the decrypting means executes the decryption process of decrypting the encrypted data stored in the data storing means, when the authenticating means determines that the authentication is successfully done.

According to the present invention, with issuance of a reproduction instruction to reproduce encrypted data, communication with the server to authenticate the portable information terminal is performed to carry out the authentication process, and when the authentication process is successfully conducted, the encrypted data is permitted to be decrypted and reproduced. In this configuration, even if the portable information terminal is lost or stolen, third party's data browsing can be prevented by rewriting the information for authentication registered in the server, into information indicating that the use of the portable information terminal is disabled. Furthermore, an access for authentication occurs for reproduction of the encrypted data from the portable information terminal, whereby the server side can detect an unauthorized browsing act.

The portable information terminal of the present invention is preferably configured as follows: it comprises confirming means for, with issuance of a reproduction instruction to reproduce the encrypted data stored in the data storing means, communicating with a server storing for each data type, information for restricting a reproduction process of encrypted data in the portable information terminal, to confirm presence or absence of a restriction on the reproduction process; and the decrypting means executes the decryption process of decrypting the encrypted data when the confirming means confirms the absence of the restriction on the reproduction process.

According to the present invention, with issuance of a reproduction instruction to reproduce encrypted data, communication is made with the server storing the information for imposing a restriction on the reproduction process of the encrypted data, to confirm the presence or absence of the restriction on the reproduction process, and, when the absence of the restriction is confirmed, the process of decrypting the encrypted data is permitted. In this configuration, even if the portable information terminal is lost or stolen, third party's data browsing can be prevented by setting the information for imposing the restriction on the reproduction process, registered in the server, into information to restrict the reproduction. Furthermore, browsing of data is individually set for each data type and thus a security level can be set for each data type, thereby realizing the user-friendly portable information terminal.

Another portable information terminal according to the present invention is one comprising: data storing means for storing encrypted data; right information storing means for storing right information necessary for a decryption process of the encrypted data and for an encryption process of plaintext data; acquiring means for, with reception of an instruction to update old right information stored in the right information storing means, acquiring new right information and storing the acquired new right information in the right information storing means; decrypting means for decrypting the encrypted data stored in the data storing means, using the old right information stored in the right information storing means, to obtain plaintext data; encrypting means for encrypting the plaintext data obtained through the decryption by the decrypting means, using the new right information acquired by the acquiring means, and for storing encrypted data in the data storing means; and erasing means for erasing the old right information from the right information storing means after completion of the encryption process by the encrypting means and the decryption process by the decrypting means.

Another data protecting method according to the present invention is a data protecting method in a portable information terminal with data storing means for storing encrypted data, and right information storing means for storing right information necessary for a decryption process of the encrypted data and for an encryption process of plaintext data, comprising: an acquiring step of, with reception of an instruction to update old right information stored in the right information storing means, acquiring new right information and storing the acquired new right information in the right information storing means; a decrypting step of decrypting the encrypted data stored in the data storing means, using the old right information stored in the right information storing means, to obtain plaintext data; an encrypting step of encrypting the plaintext data obtained through the decryption in the decrypting step, using the new right information acquired in the acquiring step, and storing encrypted data in the data storing means; and an erasing step of erasing the old right information from the right information storing means after completion of the encryption process in the encrypting step and the decryption process in the decrypting step.

According to the present invention, with occurrence of the update process of the right information, the encrypted data is decrypted using the old right information before the update, to obtain the plaintext data, the obtained plaintext data is encrypted using the new right information newly acquired, to obtain encrypted data, the encrypted data thus obtained is stored, and the old right information before the update is erased. In this configuration, with occurrence of the update process of the right information, encryption of data can be performed using the updated new right information, and the portable information terminal can be realized with an improved security level.

The portable information terminal of the present invention is preferably configured to further comprise setting means for performing a setting to validate or invalidate the right information stored in the right information storing means, by wireless communication from the outside.

In this case, whether the right information stored is to be validated or invalidated can be set by wireless communication from the outside, and even if the portable information terminal is lost or stolen, the right information can be invalidated by wireless communication from the outside, thereby preventing third party's data browsing. In addition, data browsing can be enabled by the simple process of validating the right information similarly, which can realize the user-friendly portable information terminal.

According to the present invention, a third party can be prevented from browsing stored data where the portable information terminal is lost or stolen. When compared with the technology of locking manipulation of the portable information terminal, the plaintext data is not stored in a browsable state, and thus security can be enhanced against third party's browsing of the plaintext data. When compared with the case of deleting the data, the encryption process is performed to store the plaintext data in the form of the encrypted data, and therefore it is also easy to perform the process of recovering the plaintext data from the encrypted data.

BRIEF DESCRIPTION OF THE DRAWINGS

FIG. 3 is an explanatory diagram showing right information stored in right information memory 107.

DESCRIPTION OF THE PREFERRED EMBODIMENTS

The present invention can be readily understood in view of the following detailed description with reference to the accompanying drawings presented for an embodiment. An embodiment of the present invention will be described below with reference to the accompanying drawings. Identical portions will be denoted by the same reference symbols as much as possible, without redundant description.

Figure 1:
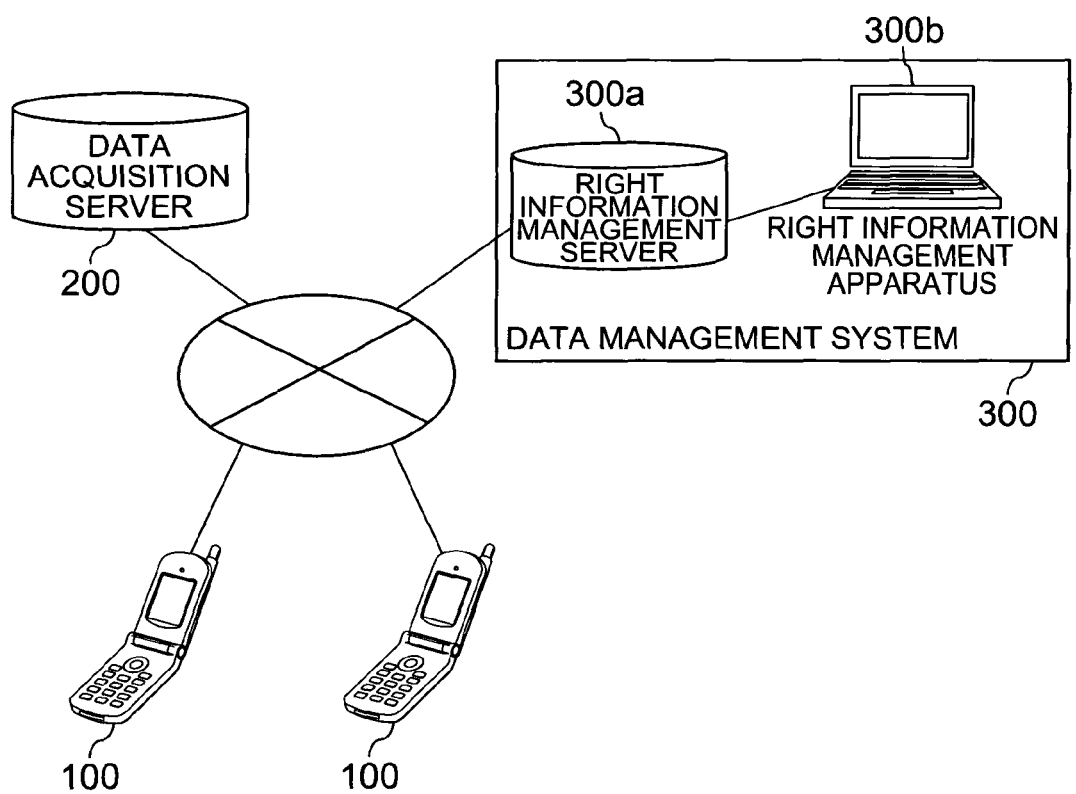
FIG. 1 is a system configuration diagram comprised of portable information terminal 100, data acquisition server 200, and data management system 300 in an embodiment of the present invention.

FIG. 1 is a system configuration diagram comprised of portable information terminals 100, data acquisition server 200, and data management system 300 in the present embodiment. This system is constructed including portable information terminals 100 used by respective users, data acquisition server 200 for portable information terminals 100 to acquire data therefrom, and data management system 300 capable of transmitting right information for encryption or decryption of data stored in the portable information terminals 100, and a control signal for manipulation of the portable information terminals 100, through a communication network to the portable information terminals 100 used by the users.

Each portable information terminal 100 has a function of acquiring and reproducing data usable in the portable information terminal 100, such as images or documents or the like, through the communication network from the data acquisition server 200, and an encryption algorithm and a decryption algorithm for encrypting and decrypting the data. Furthermore, each portable information terminal 100 has a function of acquiring and storing the right information to be used in an encryption process or in a decryption process, from the data management system 300, and encrypting or decrypting data stored in the portable information terminal 100, by the aforementioned encryption algorithm or decryption algorithm using the stored right information, on the basis of a control signal transmitted from the data management system 300 in accordance with need.

The data acquisition server 200 is a server from which portable information terminals 100 can acquire data through the communication network, e.g., a server of a contents provider, or a server in an intranet system.

The data management system 300 is constructed including right information management server 300a and right information management apparatus 300b. The right information management server 300a is a server that receives a connection request from portable information terminal 100 and responds to it, and that transmits the right information stored in the right information management server 300a, to portable information terminal 100. The right information management apparatus 300b has a function of creating right information for encryption or decryption for all portable information terminals 100, or for each portable information terminal 100, and storing or updating the right information in the right information management server 300a, information for an authentication process of portable information terminal 100, and a function for imposing a restriction on reproduction of data for each data type. It can also be contemplated without any problem that the right information management server 300a is integrally constructed in the right information management apparatus 300b.

Figure 2:
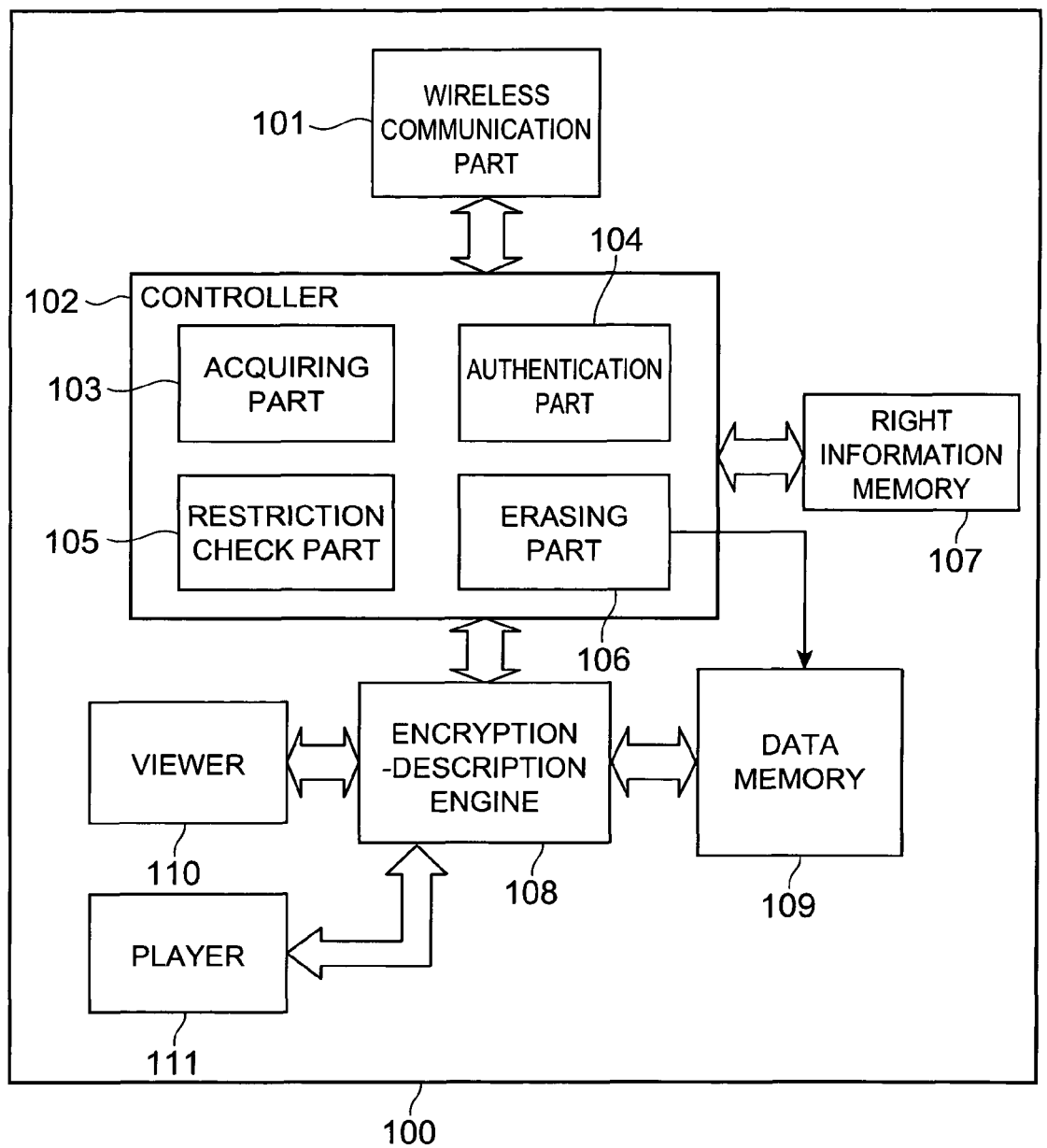
FIG. 2 is a block configuration diagram of portable information terminal 100.

FIG. 2 is a block configuration diagram of portable information terminal 100. The portable information terminal 100 is constructed including wireless communication part 101 (receiving means), controller 102 (setting means), right information memory 107 (right information storing means), encryption-decryption engine 108 (encrypting means and decrypting means), data memory 109 (data storing means), viewer 110 (reproducing means), and player 111 (reproducing means). The controller 102 includes acquiring part 103 (acquiring means), authentication part 104 (authenticating means), restriction check part 105 (confirming means), and erasing part 106 (erasing means). Each of the components will be described below.

The wireless communication part 101 is a part that performs calling or data communication through the communication network.

The controller 102 is a part that performs control of the portable information terminal 100: it checks whether the right information necessary for the encryption process and for the decryption process, stored in the right information memory 107, is valid or invalid, and performs setting of "valid" or "invalid"; it performs an update work of right information; it manages key data used in the algorithms and the encryption and decryption processes used in the encryption-decryption engine 108 and stores it in the right information memory 107; it instructs the encryption-decryption engine 108 to perform the encryption/decryption process; it stores in the right information memory 107 the right information, e.g., about availability of reproduction of data stored in the data memory 109; it checks a restriction on reproduction according to the right information. The controller 102 is constructed including acquiring part 103, authentication part 104, restriction check part 105, and erasing part 106.

The acquiring part 103 is a part that sends a request for right information through wireless communication part 101 to data management system 300 when the user gives an instruction or when the portable information terminal 100 satisfies a predetermined condition, and that acquires the requested right information from the data management system 300. The predetermined condition herein is, for example, a case where portable information terminal 100 moves from an out-of-service area into a service area, a case where a UIM (User Information Module) is replaced, a case where power is turned on, or a case where a predetermined time has elapsed.

The authentication part 104 is a part that performs authentication through communication with data management system 300, and part that transmits ID information such as a terminal ID stored in portable information terminal 100, to the data management system 300 and receives a permission signal indicating that authentication is successfully done, as a response to implement authentication. More specifically, when receiving the ID information from the authentication part 104, the data management system 300 determines whether the ID information agrees with the ID information registered in advance. When they are determined to agree, the data management system 300 transmits to the portable information terminal 100 a permission signal indicating that use of portable information terminal 100 is permitted, i.e., that the authentication is successfully done. When the authentication part 104 receives the permission signal from the data management system 300, the controller 102 checks the validity of the right information and checks permission of reproduction, and the controller 102 can make the encryption-decryption engine 108 execute the process of decryption.

The authentication part 104 may also be arranged to make the user enter a password and to send the entered password to data management system 300, instead of transmitting the ID information stored in advance, to the data management system 300.

The restriction check part 105 is a part that performs communication with data management system 300 to determine whether there is a restriction on data reproduction of data to be reproduced. Specifically, the restriction check part 105 is a part that transmits to the data management system 300 the ID information such as a terminal ID preliminarily stored in the portable information terminal 100 and information indicating a data type to represent an object of reproduction restriction, and that receives an OK signal as a response thereto, thereby performing a check on the reproduction restriction.

When receiving the ID information and data type transmitted from the restriction check part 105, the data management system 300 determines whether they agree with the ID information and data type stored in advance, and, when determining that they agree, it transmits a permission signal indicating that use of portable information terminal 100 is permitted, i.e., that there is no restriction on reproduction. When the restriction check part 105 receives the permission signal, the controller 102 checks the validity of the right information and the controller 102 can make the encryption-decryption engine 108 execute the process of decryption. If the restriction on reproduction of data is not registered for each data type, the restriction check part 105 does not have to transmit the data type.

The erasing part 106 is a part that erases plaintext data from the data memory 109 when encrypted data is obtained through encryption of the plaintext data by encryption-decryption engine 108, or that erases encrypted data from the data memory 109 when plaintext data is obtained through decryption of the encrypted data. The plaintext data is data before encrypted.

The right information memory 107 is a part that stores the right information acquired by the acquiring part 103 or the right information entered by user's manipulation. In terms of security the right information memory 107 is desirably a confidential region rejecting an editing work or an output work to the outside by user's manipulation or the like. Depending upon protection levels of data stored in the data memory 109, the right information memory 107 can be a region that a third party cannot access easily.

A specific example of the right information stored in right information memory 107 will be described below with reference to a drawing. FIG. 3 is an explanatory diagram showing the right information stored in the right information memory 107. The right information is information indicating which algorithm and which key data are to be used for encryption or decryption of specific data stored in portable information terminal 100, and consists of information indicating a data type, an algorithm type, key data, and availability of reproduction, and information indicating the necessity for server access. FIG. 3 describes an example of categories of data, such as an address book, images, etc., as data types, but it is also possible to designate the data types by use of file names. The contents of the right information can be arbitrarily rewritten by remote control from data management system 300. Each of the parameters of the right information will be described below.

The data type is information for specifying data as an object of encryption or decryption.

The algorithm type is information that specifies an algorithm for encryption or decryption. The right information memory 107 may store a description to designate algorithms of the encryption-decryption engine 108 or a description to designate algorithms for encryption and decryption mounted in the viewer 110 and in the player 111. Where portable information terminal 100 is loaded with only one algorithm, use is limited to the algorithm and the algorithm type does not have to be included as a constituent element.

The key data is information that is used on the occasion of encryption or decryption. The right information memory 107 may be configured to store a direct description of a value of key data to be used in encryption or decryption, or a description that specific information of data stored in the data memory 109 in portable information terminal 100, e.g., an arbitrary value described in data designated by the data type (an update date of a file, a file name, a value of the nth bit in the data, or the like) is to be used. Since it is also possible to provide a service for the encryption process with use of only one type of key data, the key data does not always have to be included as a constituent element, depending on the service provided.

The information indicating the availability of reproduction is information registered for each data type, and information storing settable data on whether encrypted data is permitted to be reproduced, for each data type.

The necessity for server access is information to set whether an access is needed to data management system 300 upon reproduction of data, and information for determining whether an access is made to data management system 300 in order to check a restriction on reproduction, or information to set whether authentication is required. Since it is also possible to provide a service by uniformly setting a need or no need for access, the need for server access does not always have to be included as a constituent element, depending upon the service provided.

The right information can be any information that clearly specifies the condition for encryption and the condition upon reproduction, e.g., at least the conditions of the encryption and decryption algorithms. Therefore, the right information can be any other indication method than that in FIG. 3 if it is a data structure that can be processed by portable information terminal 100.

Although not shown in FIG. 3, whether the right information is valid or invalid can also be set as the right information. Validating the right information is to add information indicating that the right information stored in the right information memory 107 is valid, and means a state in which encrypted data can be decrypted according to the right information upon reproduction thereof, or a state in which the right information can be updated. To the contrary, invalidating the right information means a state in which encrypted data cannot be decrypted upon reproduction thereof, or a state in which the right information cannot be updated.

In accordance with user's manipulation the controller 102 can set "valid" or "invalid" for each data type, or can also set "valid" or "invalid" for the entire right information stored in portable information terminal 100. In addition, in accordance with user's manipulation the controller 102 may set "valid" or "invalid" in association with each data type in the right information memory 107, or may set "valid" or "invalid" for the entire right information.

Referring again to FIG. 2, description will be continued. The encryption-decryption engine 108 is a part that encrypts plaintext data stored in data memory 109, based on the encryption algorithm and key data described in the right information stored in the right information memory 107, to generate encrypted data, or that decrypts encrypted data stored in data memory 109, based on the decryption algorithm and key data, to generate plaintext data. The encryption-decryption engine 108 outputs the encrypted data resulting from the encryption, to the data memory 109, or outputs the plaintext data resulting from the decryption, to the data memory 109. Furthermore, in reproduction the encryption-decryption engine 108 outputs the plaintext data resulting from the decryption, to the player 111 or to the viewer 110.

The encryption algorithm stored as the right information can be an arbitrary algorithm, depending upon a protection level of data in the portable information terminal 100 or the like, and it is also possible to mount a plurality of algorithms in one portable information terminal 100.

FIG. 2 illustrates the viewer 110 and the player 111 as separate blocks from the block of encryption-decryption engine 108, but it is also possible to mount the encryption-decryption engine 108 inside the viewer 110 and player 111, depending upon the viewer 110 and player 111. In this case, the terminal can also be configured so that the viewer 110 and player 111 acquire the right information from the controller 102 and use is made of the encryption-decryption engine 108 inside the viewer 110 and player 111.

The data memory 109 is a memory that stores data acquired by wireless communication part 101, data created in portable information terminal 100 (e.g., telephone numbers, mail addresses, etc.), encrypted data resulting from encryption by encryption-decryption engine 108, or plaintext data resulting from decryption. The data memory 109 may be a memory detachably mounted on the portable information terminal 100, or memory fixed inside the terminal.

The viewer 110 is a part that displays plaintext data resulting from decryption by encryption-decryption engine 108, for example, an application to display an address book, or an application having functions of displaying, editing, or storing image data.

The player 111 is a part that reproduces plaintext data resulting from decryption by encryption-decryption engine 108, for example, an application to reproduce a ringing melody or music data.

Figure 4:
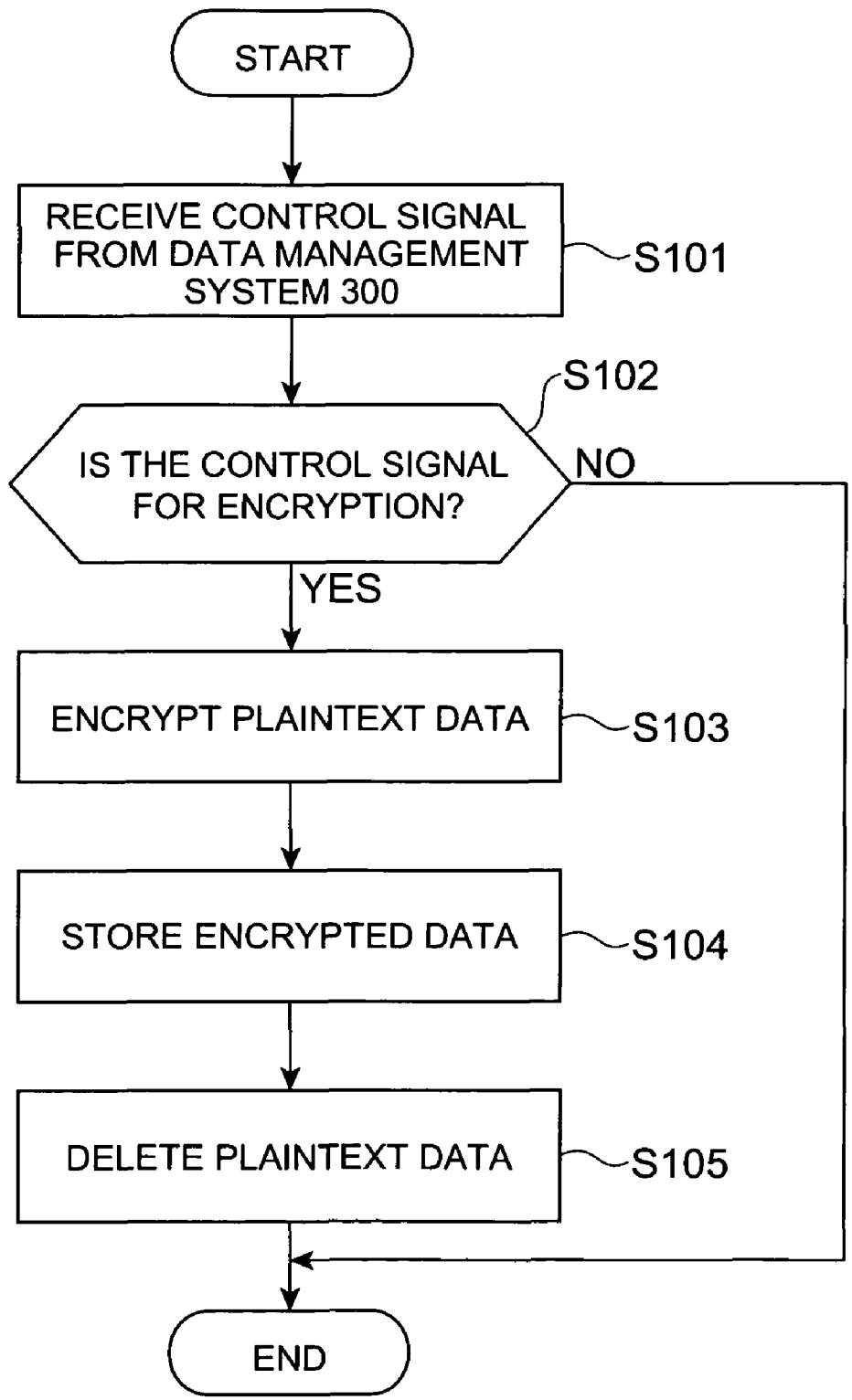
FIG. 4 is a flowchart showing an operation of encrypting plaintext data on the basis of a control signal.

Next, an operation of portable information terminal 100 constructed as described above will be described. FIG. 4 is a flowchart showing an operation of encrypting plaintext data stored in data memory 109 of portable information terminal 100, based on a control signal transmitted from data management system 300.

A control signal for encrypting plaintext data stored in the data memory 109 is received through wireless communication part 101 from data management system 300 (S101). The controller 102 determines whether the received control signal is a control signal for encryption (S102). The control signal includes a description of a data type indicating data as an object of encryption, along with information indicating execution of an encryption process, and the controller 102 specifies the encryption algorithm and key data for encryption, according to the right information stored in the right information memory 107. In the case where the algorithm type of the encryption algorithm and the key data for encryption are designated by the data management system 300, the system is configured to transmit the data type, the algorithm type, and the key data described in the right information shown in FIG. 3, together to implement the designation of the algorithm type and key data from the data management system 300.

When the controller 102 determines that the control signal is one for encryption, the encryption-decryption engine 108 encrypts plaintext data stored in the data memory 109, according to the right information stored in right information memory 107 (S103). In the case where the right information is described so as to encrypt the data, using the encryption-decryption engine mounted in the viewer 110 or in the player 111, the encryption process is carried out using the mounted encryption-decryption engine. The encrypted data resulting from the encryption process is stored in data memory 109 (S104) and the erasing part 106 erases the plaintext data from the data memory 109 (S105).

The encrypted data does not always have to be stored in a storage area where the plaintext data is stored, in the data memory 109, but it may also be stored in a storage area at a higher confidential level than the foregoing storage area. The encryption algorithm to be used and the key data for encryption can be preliminarily set depending upon a service to be provided and, in that case, the control signal to be transmitted may be a control signal indicating only "encrypt." The control signal to be transmitted may also be one indicating encryption of the entire data stored in data memory 109.

Figure 5:
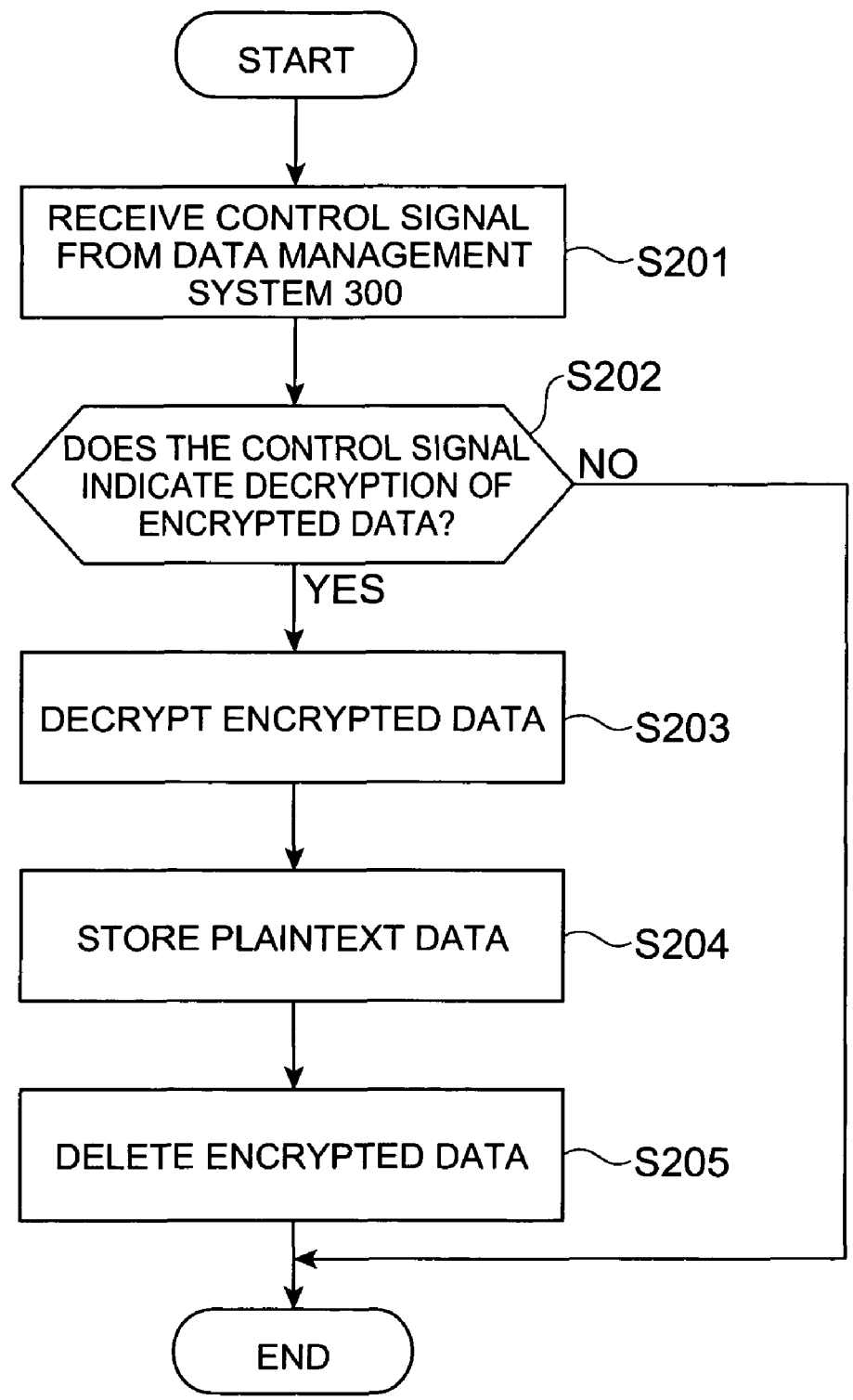
FIG. 5 is a flowchart showing an operation of decrypting encrypted data on the basis of a control signal.

An operation of decrypting encrypted data stored in data memory 109 will be described below. FIG. 5 is a flowchart showing an operation of decrypting encrypted data stored in data memory 109 of portable information terminal 100, based on a control signal transmitted from data management system 300.

A control signal for decrypting encrypted data stored in data memory 109 is received through wireless communication part 101 from data management system 300 (S201). The controller 102 determines whether the received control signal is one indicating decryption of encrypted data stored in the data memory 109 (S202). The control signal includes a description of a data type indicating data as an object of decryption, along with the information indicating execution of the decryption process, and the decryption algorithm and key data for decryption are specified according to the right information stored in the right information memory 107. In the case where the algorithm type of the decryption algorithm and the key data for decryption are designated by the data management system 300, the data management system is configured to transmit the data type, algorithm type, and key data described in the right information shown in FIG. 3, together to implement the designation of the algorithm type and key data from the data management system 300.

When the controller 102 determines that the control signal is one indicating execution of decryption of encrypted data, the encryption-decryption engine 108 decrypts the encrypted data stored in data memory 109, according to the right information stored in the right information memory 107 (S203). In the case where the right information includes the description of decryption using the encryption-decryption engine mounted in the viewer 110 or in the player 111, the decryption process is carried out using this mounted encryption-decryption engine. Plaintext data resulting from the decryption process is stored in data memory 109 (S204) and the erasing part 106 erases the encrypted data from the data memory 109 (S205).

In the case where the encrypted data is stored in a highly confidential data area in the data memory 109, the plaintext data is first stored in the ordinary data area and thereafter the erasing part 106 erases the encrypted data stored in the highly confidential data storage area. The decryption algorithm to be used and the key data for decryption can be preliminarily set depending upon a service to be provided, and in that case, the control signal to be transmitted can be one indicating only "decrypt." In addition, the control signal to be transmitted may also be one for decrypting the entire data stored in data memory 109.

Figure 6:
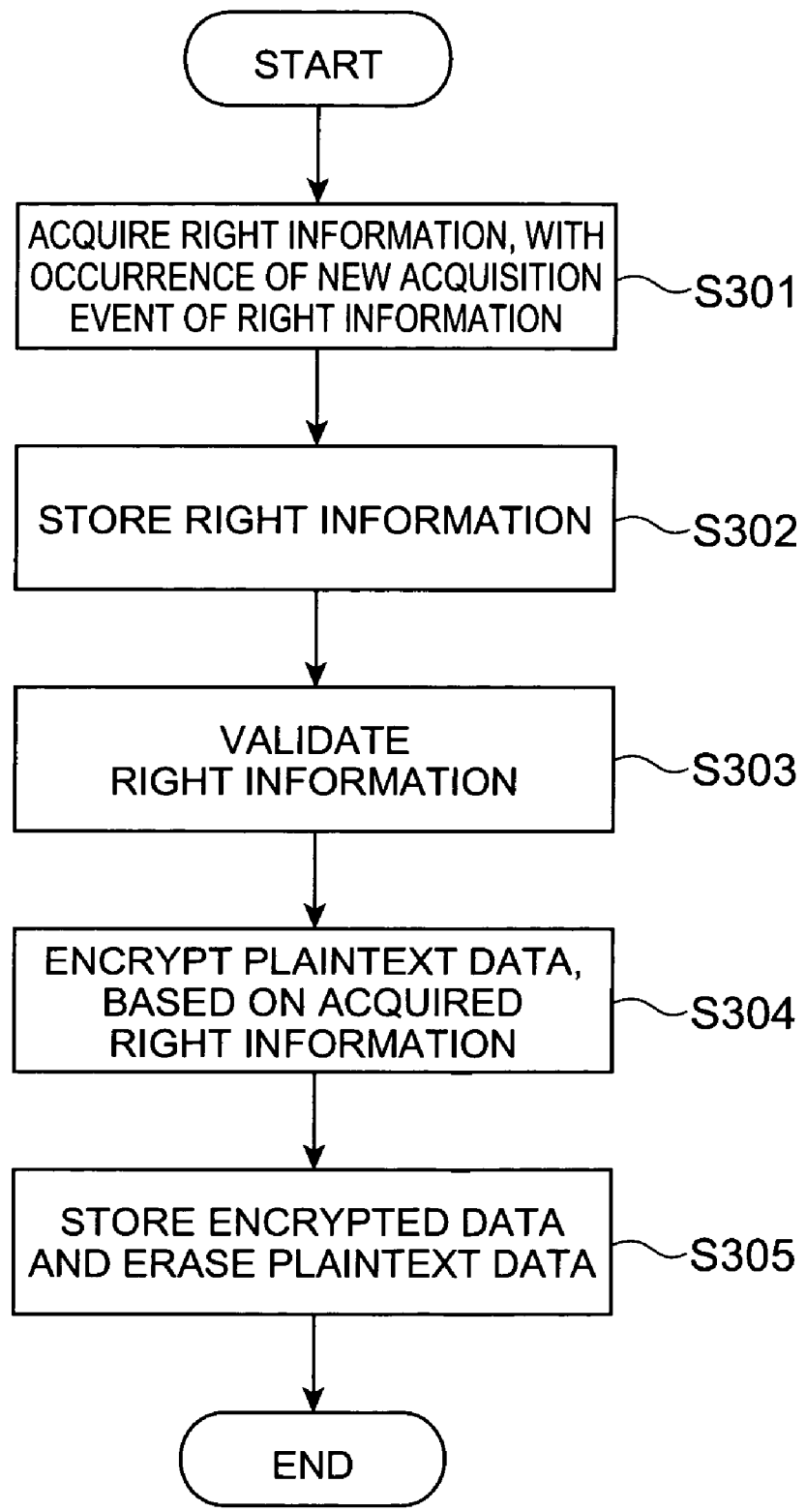
FIG. 6 is a flowchart showing an operation of performing an encryption process using acquired right information.

An operation of performing an encryption process using the right information will be described below. FIG. 6 is a flowchart showing an operation in which portable information terminal 100 acquires the right information from data management system 300 and performs the encryption process using the acquired right information.

When a new acquisition event of right information arises by user's manipulation to send a request for acquisition of right information to data management system 300, the portable information terminal 100 carries out acquisition of right information (S301). The request for acquisition of right information herein is sent along with a data type to data management system 300 and the data management system 300 sends an algorithm type and key data corresponding to the data type in the request to the portable information terminal 100. The request for acquisition of right information may also be carried out through telephone communication between the user and an operator of data management system 300. In this case, the occurrence of the event described in S301 is absent, and the right information is transmitted to portable information terminal 100 by push delivery from data management system 300. The right information may also be acquired in a lump for objects of all the data types. Where the right information is acquired in a lump, it is necessary to describe information indicating all the data types, or to individually describe the data types, in the information indicating the request for acquisition of right information.

When new right information is acquired, the new right information thus acquired is stored in the right information memory 107 (S302). The right information stored is validated in the right information memory 107 (S303). Validating the right information means information indicating that the right information stored in right information memory 107 is valid, and is to activate a state in which decryption can be performed according to the right information on the occasion of reproducing the encrypted data. Contrary to it, invalidating the right information is to activate a state in which decryption cannot be performed on the occasion of reproducing the encrypted data. In accordance with user's manipulation the controller 102 can set "valid" or "invalid" for each data type, or can set "valid" or "invalid" for the entire right information stored in the portable information terminal 100. In accordance with user's manipulation the controller 102 may set "valid" or "invalid" in association with each data type in the right information memory 107, or may set "valid" or "invalid" for the entire right information. Furthermore, this validation process may be performed after the process at S304 or at S305.

After the acquisition of the right information and the execution of the validation process, the encryption-decryption engine 108 encrypts plaintext data stored in data memory 109, based on the acquired right information (S304), and encrypted data resulting from the encryption is stored in data memory 109 while the plaintext data stored in the data memory 109 is deleted (S305). Thereafter, when the right information is valid upon reproduction of the encrypted data, the decryption process by encryption-decryption engine 108 is enabled. When the right information is invalid, the decryption process by encryption-decryption engine 108 is disabled.

Figure 7:
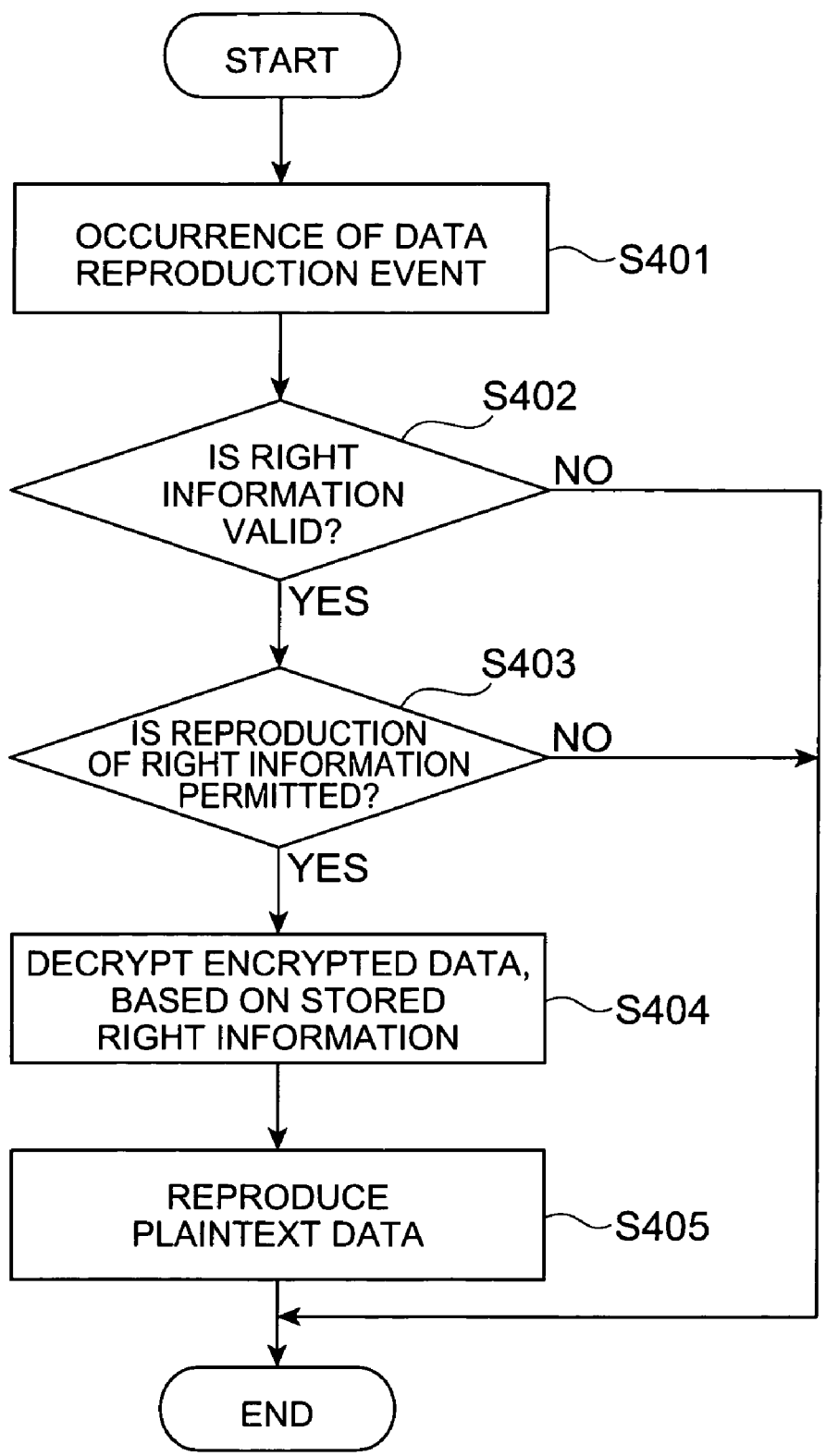
FIG. 7 is a flowchart showing an operation of decrypting encrypted data and performing reproduction.

An operation of decrypting encrypted data stored in data memory 109 and performing reproduction in accordance with user's manipulation will be described below. FIG. 7 is a flowchart showing an operation of decrypting encrypted data and performing reproduction. The flowchart shown in FIG. 7 is a process based on the assumption that data stored in portable information terminal 100 is always stored in the form of encrypted data.

An event of reproduction occurs according to user's manipulation (S401). The user's manipulation herein is, for example, an operation for browsing a telephone book or a mail address book registered, or for browsing image data registered. With occurrence of the event of reproduction, the controller 102 determines whether the right information stored in right information memory 107 is valid (S402). In the case where either "valid" or "invalid" is set for each data type, it is determined whether the right information in a data type to be browsed is valid. When the controller 102 determines that the right information is invalid, the decryption process is avoided to terminate processing. The processing may be terminated after the user is informed that reproduction is prohibited.

When the controller 102 determines that the right information is valid, the controller 102 determines whether the right information memory 107 stores information that reproduction of the right information of the data type to be browsed is permitted (S403). When the right information memory stores the information that the reproduction is prohibited, the decryption process is avoided to terminate processing. The processing may be terminated after the user is informed that the reproduction is prohibited.

When the controller 102 determines that the reproduction of the right information is permitted, the encryption-decryption engine 108 decrypts encrypted data, based on the right information (algorithm type and key data) stored in right information memory 107 (S404). The plaintext data obtained by decryption is reproduced by viewer 110 or player 111 (S405). The step S404 may be arranged to perform the decryption using the encryption-decryption engine mounted in the viewer 110 or in the player 111, based on the setting described in the right information.

In the present embodiment, the effect of preventing third party's data browsing can be achieved by performing at least either one of the process at S402 of determining whether the right information is valid, and the process at S403 of determining whether reproduction of the right information is permitted.

Figure 8:
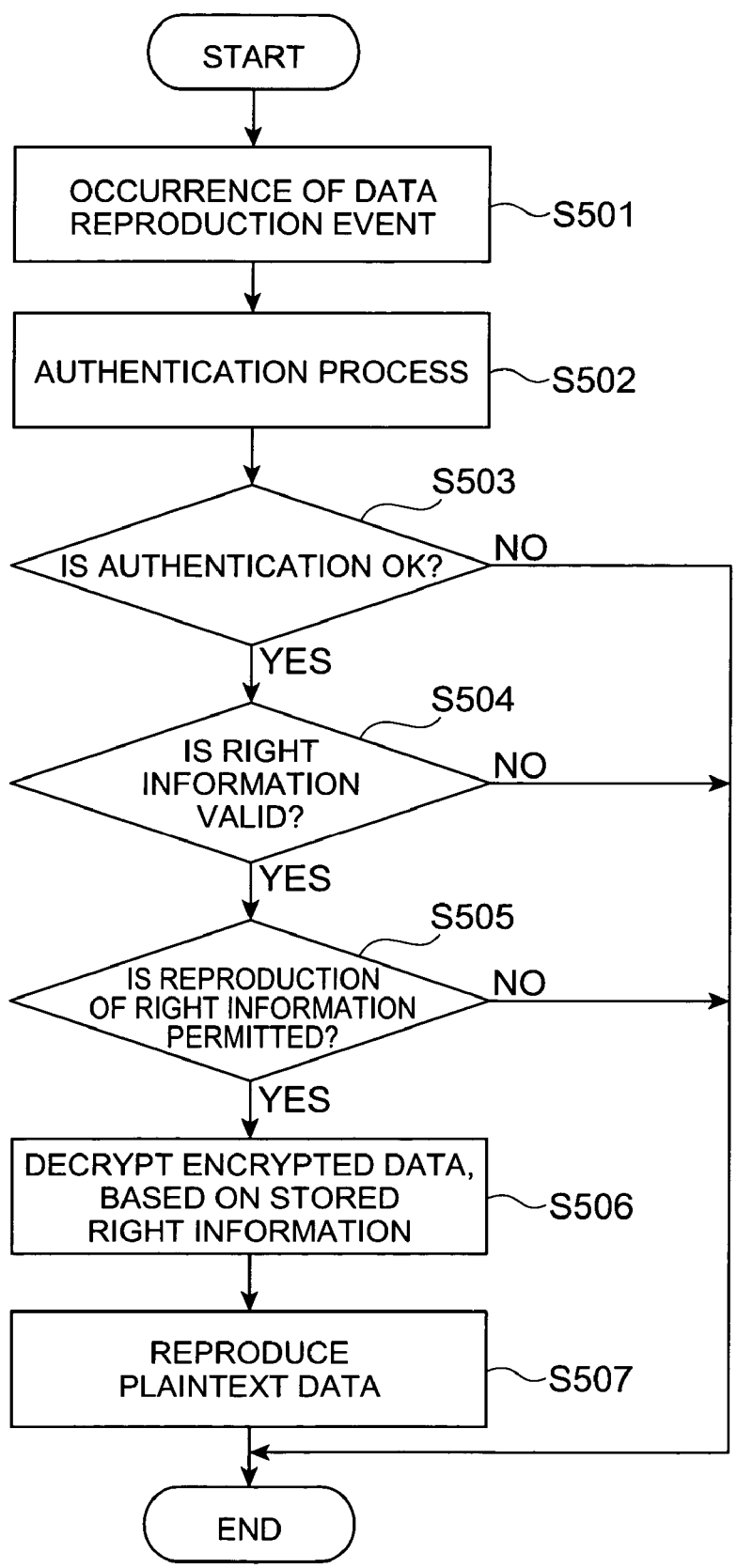
FIG. 8 is a flowchart showing an operation of performing an authentication process on the occasion of decrypting encrypted data and performing reproduction.

The following will describe an operation of performing an authentication process on the occasion of decrypting encrypted data and performing reproduction according to user's manipulation, and operation in the case where "authentication" is described in the server access column of the right information shown in FIG. 3. FIG. 8 is a flowchart showing an operation of performing an authentication process on the occasion of decrypting encrypted data and performing reproduction.

An event of reproduction occurs according to user's manipulation (S501). The reproduction event herein is, for example, an operation for browsing a telephone book or a mail address book registered, or for browsing image data registered. With occurrence of the event of reproduction, the authentication part 104 performs an authentication process (S502). Specifically, the authentication part 104 transmits ID information such as a terminal ID of portable information terminal 100 stored in advance, through the wireless communication part 101 to the data management system 300. When the data management system 300 determines that the received ID information agrees with ID information preliminarily set, the data management system 300 returns an OK signal to indicate that the portable information terminal 100 is authorized, and the portable information terminal 100 receives this OK signal to complete the authentication process. Instead of transmitting the ID information from the portable information terminal 100, it is also possible to adopt a configuration wherein the user enters a password in the portable information terminal 100 and the entered password is transmitted to data management system 300. In this case, the data management system 300 determines whether the user is authorized based on the entered password and, with a determination of "authorized," an OK signal indicating "authorized" is transmitted to the portable information terminal 100.

When the authentication part 104 fails to successfully perform the authentication process (S503), the processing is terminated. On the occasion of terminating the processing, the user may be informed of an authentication error. When the authentication part 104 successfully performs the authentication process (S503), the controller 102 determines whether the right information stored in the right information memory 107 is valid (S504). Where "valid" or "invalid" is set for each data type, it is determined whether the right information in a data type to be browsed is valid. When the controller 102 determines that the right information is invalid, the processing is terminated. The processing may be terminated after the user is informed of prohibition of reproduction.

When the controller 102 determines that the right information is valid, the controller 102 determines whether the right information memory 107 stores information that reproduction of the right information of the data type to be browsed is permitted (S505). When prohibition of reproduction is stored, the processing is terminated. The processing may be terminated after the user is informed of prohibition of reproduction.

When the controller 102 determines that the reproduction of the right information is permitted, the encryption-decryption engine 108 decrypts encrypted data, based on the right information (algorithm type and key data) stored in the right information memory 107 (S506). Plaintext data obtained by the decryption is reproduced by viewer 110 or player 111 (S507). The step S506 may be arranged to perform the decryption using the encryption-decryption engine mounted in the viewer 110 or in the player 111, based on the setting described in the right information. The authentication process with the right information management server and the confirmation process of availability of reproduction in the portable information terminal 100 may be arranged in the reverse order.

When the authentication process of accessing the data management system 300 is added as described above, browsing of data in portable information terminal 100 can be restricted by changing the setting about authentication stored in the data management system 300 if the user loses the portable information terminal 100. Since the authentication access for reproduction of encrypted data occurs from portable information terminal 100, the data management system 300 can detect an unauthorized browsing act.

Figure 9:
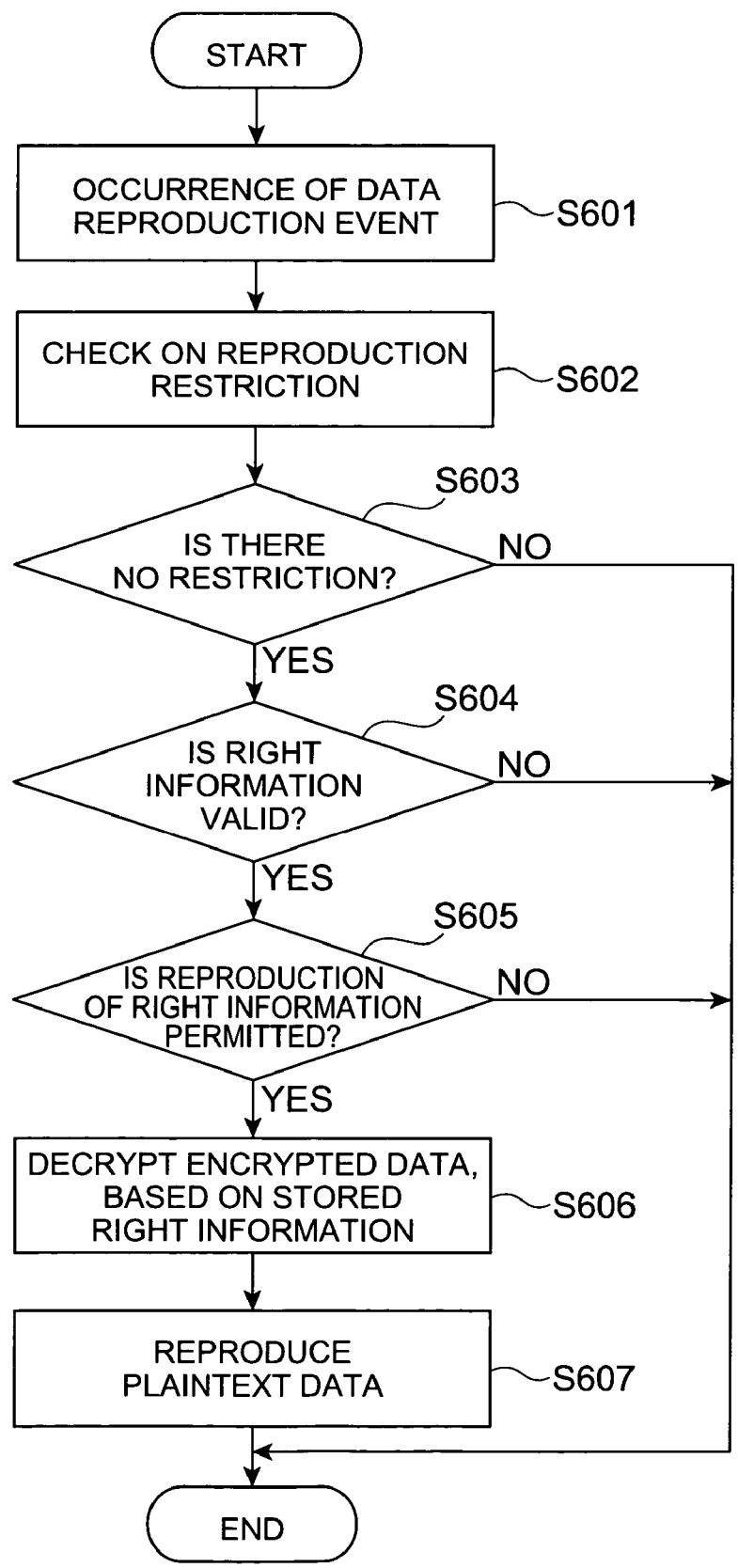
FIG. 9 is a flowchart showing an operation of performing a confirmation process to confirm a restriction on reproduction on the occasion of decrypting encrypted data and performing reproduction.

The following will describe an operation of performing a process of confirming a restriction on reproduction on the occasion of decrypting encrypted data and performing reproduction according to user's manipulation, and operation performed when "reproduction availability check" is described in the server access column of the right information shown in FIG. 3. FIG. 9 is a flowchart showing an operation of performing a confirmation process of a reproduction restriction on the occasion of decrypting encrypted data and performing reproduction.

An event of reproduction occurs according to user's manipulation (S601). The user's manipulation herein is, for example, an operation for browsing a telephone book or a mail address book registered or for browsing image data registered. With occurrence of the reproduction event, the restriction check part 105 performs a process of checking whether there is a restriction on reproduction of data to be reproduced, on the data management system 300 (S602). Specifically, the restriction check part 105 transmits ID information such as a terminal ID of portable information terminal 100 preliminarily stored, and a data type through wireless communication part 101 to the data management system 300. When the data management system 300 determines that the ID information and data type agree with those set in advance, the data management system 300 returns an OK signal to indicate that browsing of the data type to be reproduced is permitted, and the reception of this OK signal completes the process of checking the restriction on reproduction. The above describes the check on whether there is a reproduction restriction for each data type, but it is also possible to adopt a configuration wherein whether there is a reproduction restriction on portable information terminal 100 is determined, without checking the presence or absence of the reproduction restriction for each data type. In that case, there is no need for transmitting the data type to the data management system 300.

When the restriction check part 105 determines that there is a restriction on reproduction of data to be reproduced (S603), the processing is terminated. On the occasion of terminating the processing, the user may be informed that there is a restriction on reproduction of the data. When the restriction check part 105 determines that there is no restriction on reproduction of the data to be reproduced (S603), the controller 102 determines whether the right information stored in right information memory 107 is valid (S604). When the controller 102 determines that the right information is invalid, the processing is terminated. The user may be informed of the prohibition of reproduction and then the processing is terminated.

When the controller 102 determines that the right information is valid, the controller 102 determines whether the right information memory 107 stores information that reproduction of the right information of the data type to be browsed is permitted (S605). If prohibition of reproduction is stored, the processing will be terminated. The processing may be terminated after the user is informed of the prohibition of reproduction.

When the controller 102 determines that the reproduction of the right information is permitted, the encryption-decryption engine 108 decrypts encrypted data, based on the right information (algorithm type and key data) stored in right information memory 107 (S606). Plaintext data obtained by the decryption is reproduced by viewer 110 or player 111 (S607). The step S606 may be arranged to perform the decryption using the encryption-decryption engine mounted in the viewer 110 or in the player 111, based on the setting described in the right information. The confirmation process of availability of reproduction in the data management system 300 and the confirmation process of availability of reproduction in the portable information terminal 100 may be arranged in the reverse order.

As described above, portable information terminal 100 is configured to reference the right information managed by the data management system 300, on the occasion of reproduction of data, and, therefore, even if the right information is illegally rewritten on the portable information terminal 100 side, reproduction can be prevented and third party's unauthorized data browsing can be prevented thereby. If browsing of data stored in portable information terminal 100 is individually set for each data, the security level can be set for each data type, which can realize user-friendly portable information terminal 100.

The authentication process shown in FIG. 8 and the restriction check process shown in FIG. 9 may be operated in portable information terminal 100 as arbitrarily switched by the user, or the both functions may be executed.

Figure 10:
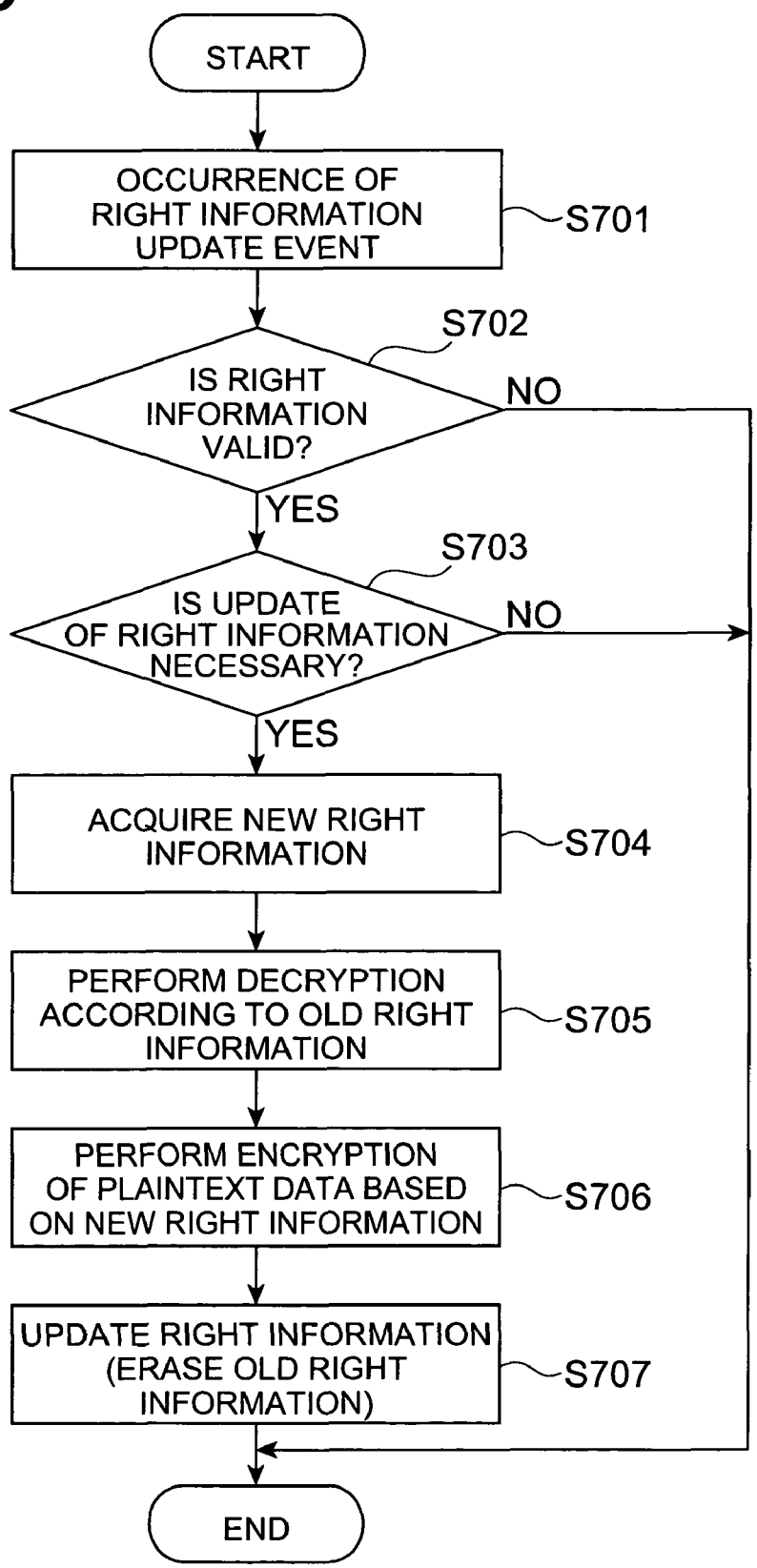
FIG. 10 is a flowchart showing an operation of portable information terminal 100 in an update process of right information.

The following will describe an operation of portable information terminal 100 in an update of the right information stored in right information memory 107. FIG. 10 is a flowchart showing an operation of portable information terminal 100 in an update of right information.

The portable information terminal 100 detects occurrence of an event of an update of the right information (S701). The right information update event occurs in a case where the user performs an update operation of the right information, in a case where a predetermined duration has elapsed in a mode of periodically performing the update process, or in a case where a specific event (e.g., a transition from an out-of-service area to a service area, replacement of UIM, turning-on of power, etc.) occurs. The method of manually performing the update operation by user's manipulation permits a third party illegally acquiring the portable information terminal, to execute the update event, but the unauthorized operation can be prevented on the data management system 300 side by restricting the update, using the authentication process or the reproduction restriction check process shown in FIG. 8 or in FIG. 9.

With occurrence of the update event of the right information, the controller 102 determines whether the right information stored in right information memory 107 is valid (S702). Where "valid" or "invalid" is set for each data type, it is determined whether the right information in a data type to be browsed is valid. When the controller 102 determines that the right information to be updated is invalid, the processing is terminated. The processing may be terminated after the user is informed that the update of the right information is unavailable.

When the right information is invalid, a restriction can be imposed so as to prevent reacquisition of the right information from being executed even with occurrence of an update event of the right information. This can prohibit browsing of data in the portable information terminal 100 unless the granter of the right information (the user of portable information terminal 100) removes the restriction.

When the controller 102 determines that the old right information to be updated is valid, the controller 102 determines whether there is a need for the update of the right information (S703). Namely, when the data management system 300 stores new right information, the controller 102 determines that the update process is necessary. More specifically, the controller 102 acquires update history information such as version information of the right information from data management system 300 and determines whether the update process of the right information is necessary, based on the update history information thus acquired.

When the controller 102 determines that the update of the old right information is necessary, the new right information is acquired from data management system 300 through the use of acquiring part 103 (S704). Then the encryption-decryption engine 108 decrypts the data, using the old right information before the update (S705); plaintext data obtained by the decryption is encrypted using the acquired new right information and the encrypted data is stored in data memory 109 (S706). Then the acquired new right information is stored in right information memory 107, the erasing part 106 erases the old right information from right information memory 107, and the encrypted data based on the old right information is erased from the data memory 109, thereby performing the update process of the right information (S707). Together with the update process, the validation process is also performed so as to validate the new right information stored.

When at S703 the controller 102 fails to confirm that the update is necessary, the update process is not carried out and on the occasion of reproduction the encryption-decryption engine 108 performs reproduction using the algorithm described in the old right information. It is also possible to adopt a configuration wherein the controller 102 does not permit reproduction using the old right information and, after normal completion of the update process (e.g., after several retrials), the encryption-decryption engine 108 performs encryption according to the updated right information. Either of the above-described methods may be alternatively selected in accordance with the occurrence condition of the update event of the right information.

In a case where data is transferred between portable information terminals by legal means, a preferred configuration is such that when the portable information terminal as a data receiver updates the right information, it does not execute the decryption process with the old right information and the encryption process with the new right information in the update process of the right information, but performs the update process of the right information by acquiring the right information stored in the portable information terminal as a data sender, from the data management system 300 or from the sender portable information terminal and acquiring the new right information from data management system 300.

By arbitrarily updating the right information, as described above, it is feasible to enhance the security level against third party's unauthorized data browsing.

Figure 11:
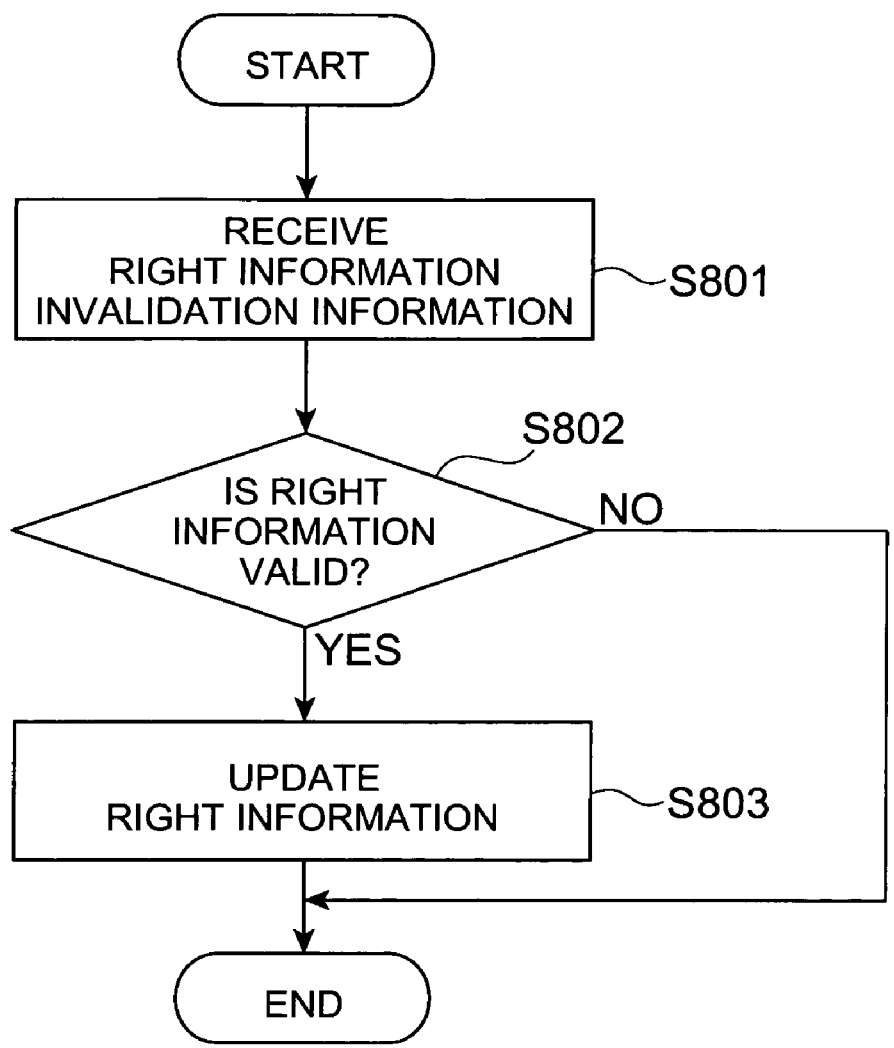
FIG. 11 is a flowchart showing an operation of portable information terminal 100 in a process of invalidating right information.

The following will describe an operation of portable information terminal 100 to invalidate the right information stored in portable information terminal 100. FIG. 11 is a flowchart showing an operation of portable information terminal 100 to invalidate the right information.

Invalidation information indicating that the function of the right information stored in portable information terminal 100 is to be invalidated is received through wireless communication part 101 from data management system 300 (S801). The controller 102 determines whether the right information stored in right information memory 107 is set as valid (S802). When the right information is set as valid, the right information stored in the right information memory 107 is set to be invalid, thereby performing the update of the right information (S803). When the right information is set as invalid, the processing is directly terminated.

By invalidating the right information, as described above, it becomes feasible to prevent a third party from browsing data (e.g., an address book) stored in portable information terminal 100, for example, if the portable information terminal 100 is lost, and thus to realize protection of data when portable information terminal 100 is lost.

The information indicating the invalidation of right information, and the right information is separately managed in the description of FIG. 11, but it is also possible to adopt a configuration wherein when portable information terminal 100 receives the invalidation information indicating the invalidation of the right information, it rewrites the entire information indicating the availability of reproduction of data described as the right information, into prohibition of reproduction, thereby limiting the reproduction of data. In addition, the information on availability of reproduction stored as the right information can also be similarly set.

Figure 12:
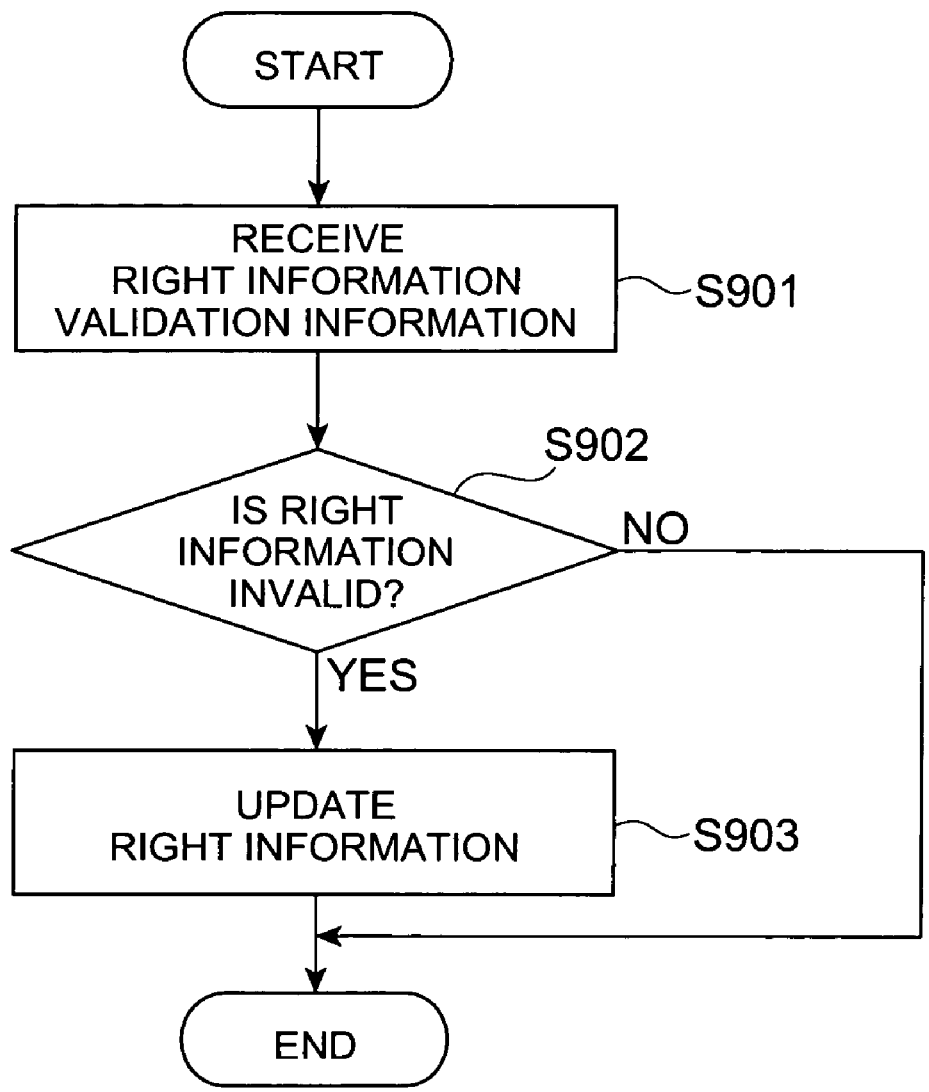
FIG. 12 is a flowchart showing an operation of portable information terminal 100 in a process of validating right information.

The following will describe an operation of portable information terminal 100 to validate the right information stored in portable information terminal 100. FIG. 12 is a flowchart showing an operation of portable information terminal 100 to validate the right information.

Validation information indicating that the function of the right information stored in portable information terminal 100 is to be validated is received through wireless communication part 101 from data management system 300 (S901). The controller 102 determines whether the right information stored in right information memory 107 is set as invalid (S902). When the right information is set as invalid, the right information stored in right information memory 107 is set to be valid, thereby performing the update of the right information (S903). When the right information is set as valid, the processing is directly terminated.

In a case where browsing of data is prohibited by the process of FIG. 11 and where lost portable information terminal 100 is found, the process of FIG. 12 permits the data stored in portable information terminal 100 to be browsed again by the simple operation. When the right information is invalidated as described above, only the granter of the right information is allowed to release the invalidated state, which can prevent data browsing by unauthorized manipulation of portable information terminal 100.

The information indicating the validation of right information, and the right information is separately managed in the description of FIG. 12, but it is also possible to adopt a configuration where, when the portable information terminal 100 receives the validation information indicating the validation of right information, it rewrites the entire information being the prohibition of reproduction in the information indicating the availability of reproduction described as the right information, into permission of reproduction. Similarly, the information on availability of reproduction stored as the right information can also be set.

The following will describe the action and effect of portable information terminal 100 in the present embodiment. This portable information terminal 100 permits the following operation: wireless communication part 101 receives a control signal; when the received control signal is determined to be an instruction signal to execute the encryption process of plaintext data stored in data memory 109, the encryption-decryption engine 108 performs the encryption process on the plaintext data stored in data memory 109; the encrypted data resulting from the encryption is stored in data memory 109, and the plaintext data before the encryption is erased from data memory 109. This can prevent a third party from browsing the data stored in the data memory 109, for example, if the portable information terminal 100 is lost or stolen. When compared with the technology of locking manipulation of portable information terminal 100, the plaintext data is not stored in a browsable state and thus the security can be enhanced against third party's browsing of plaintext data. When compared with the case of deleting the data, the encryption process is performed to store the plaintext data in the form of the encrypted data in the data memory 109 and therefore it is also easy to perform the process of recovering the plaintext data from the encrypted data.

This portable information terminal 100 also permits the following operation: the acquiring part 103 acquires the right information necessary for the encryption process of plaintext data and for the decryption process of encrypted data from data management system 300; the acquired right information is validated and stored in right information memory 107; the encryption-decryption engine 108 encrypts plaintext data, based on the right information, and stores encrypted data in data memory 109; the plaintext data before the encryption is erased from data memory 109. When the right information is valid, the encryption-decryption engine 108 enables the decryption process so as to permit reproduction of encrypted data. This permits the encryption-decryption engine 108 to encrypt the plaintext data, using the right information, and permits the encryption-decryption engine 108 to perform the decryption process of encrypted data when the right information is valid, with issuance of a reproduction instruction to reproduce the encrypted data. Therefore, third party's data browsing can be restricted by simply setting the right information invalid. Accordingly, a third party is prevented from browsing data stored, even if the portable information terminal 100 is lost or stolen. When compared with the technology of locking manipulation of portable information terminal 100, the plaintext data is not stored in a browsable state and therefore the security can be enhanced against third party's browsing of plaintext data. When compared with the case of deleting the data, the encryption process is performed to store the plaintext data in the form of encrypted data and therefore it is also easy to perform the process for recovering the plaintext data from the encrypted data.

This portable information terminal 100 also permits the following operation: when the right information is valid, with issuance of an instruction to reproduce encrypted data stored in advance, the encryption-decryption engine 108 decrypts the encrypted data according to the right information stored in advance in the data memory 109, to obtain plaintext data; the viewer 110 or the player 111 reproduces the plaintext data obtained. This permits the encrypted data to be reproduced by user's manipulation. Furthermore, the data is reproduced with the right information being valid, and, therefore, even if the portable information terminal 100 is lost or stolen, the right information can be invalidated, thereby preventing third party's browsing of data.

In addition, this portable information terminal 100 permits availability of reproduction of encrypted data to be stored as right information for each data type in right information memory 107, and is thus able to perform meticulous management for each data type.

This portable information terminal 100 also permits the following operation: with issuance of a reproduction instruction to reproduce encrypted data, the authentication part 104 performs the authentication process through communication with data management system 300 for performing authentication of the portable information terminal; when the authentication process is successfully performed, the encryption-decryption engine 108 decrypts the encrypted data; the viewer 110 or the player 111 reproduces the decrypted data. This can prevent third party's data browsing by rewriting the information for authentication registered in data management system 300, into prohibition of use of portable information terminal 100, even if the portable information terminal 100 is lost or stolen. Furthermore, the authentication access for reproduction of encrypted data occurs from the portable information terminal 100, and thus the server side can detect an unauthorized browsing act.

This portable information terminal 100 also permits the following operation: with issuance of a reproduction instruction to reproduce encrypted data, the restriction check part 105 performs communication with data management system 300 storing the information for imposing a restriction on the reproduction process of encrypted data, to check the presence or absence of the restriction on the reproduction process; when it is confirmed that there is no restriction, the encryption-decryption engine 108 performs the process of decrypting the encrypted data. This can prevent third party's data browsing by setting the information for imposing the restriction on the reproduction process, registered in the data management system 300, so as to restrict the reproduction, even if the portable information terminal 100 is lost or stolen. Furthermore, if the browsing of data stored in data memory 109 is individually set for each data type, the security level can be set for each data type, which can realize user-friendly portable information terminal 100.

This portable information terminal 100 also performs the following operation: with an update process of the right information, the encryption-decryption engine 108 decrypts the encrypted data, using the old right information before the update, stored in right information memory 107, to obtain plaintext data; the encryption-decryption engine 108 encrypts the plaintext data obtained by the acquiring part 103, using the new right information newly acquired, to obtain encrypted data, and stores the encrypted data in the data memory 109; the erasing part 106 erases the old right information before the update. This permits the data to be encrypted using the updated new right information, with the update process of right information, whereby the portable information terminal 100 is realized with the improved security level.

This portable information terminal 100 also performs the following operation: the controller 102 can set the stored right information as valid or invalid through wireless communication from outside (data management system 300); even if the portable information terminal 100 is lost or stolen, the right information can be invalidated by wireless communication from the outside, whereby third party's data browsing can be prevented. The data browsing can be enabled by the simple process of validating the right information similarly, which can realize user-friendly portable information terminal 100.

The disclosure of Japanese Patent Application No. 2005-047860 filed Feb. 23, 2005 including specification, drawings and claims is incorporated herein by reference in its entirety.

What is claimed is:

1. A portable information terminal comprising:
   data storing means for storing plaintext data or encrypted data;
   receiving means for receiving a control signal from an external device through wireless communication over a network;
   an encrypting unit configured to, when the control signal received by the receiving means is an instruction signal to execute an encryption process on plaintext data stored in the data storing means, encrypt the plaintext data stored in the data storing means, and store the encrypted data resulting from the encryption process, in the data storing means;
   right information storing means for storing right information necessary for a decryption process of the encrypted data stored in the data storing means, wherein the right information further includes a separate indication as to whether reproduction of the encrypted data is enabled, for each different data type;
   a decrypting unit configured to, when the right information including the separate indication for each different data type stored in the right information storing means is valid, with issuance of a reproduction instruction to reproduce the encrypted data stored in the data storing means, execute a decryption process on the encrypted data stored in the data storing means, using the right information and, when the right information stored in the right information storing means is invalid, avoid executing the decryption process on the encrypted data stored in the data storing means, using the right information;
   a reproducing unit configured to reproduce plaintext data resulting from the decryption process by the decrypting unit; and
   an authenticating unit configured to perform an authentication process through communication with the external device over the network for performing authentication of the portable information terminal, when issuance of the reproduction instruction to reproduce data stored in the data storing means is received which includes an input from a user for searching data stored on the portable information terminal,
   wherein when the portable information terminal receives the reproduction instruction, the decrypting unit executes the decryption process of decrypting the encrypted data stored in the data storing means when the authenticating unit determines that the authentication is successfully done and when a data type for the data which the user is searching is enabled for reproduction according to the separate indication for each different data type in the stored right information.

2. The portable information terminal according to claim 1, comprising a confirming unit configured to, with issuance of the reproduction instruction to reproduce the encrypted data stored in the data storing means, communicate with the server storing for each data type, information for restricting a reproduction process of encrypted data in the portable information terminal, to confirm presence or absence of a restriction on the reproduction process,
   wherein the decrypting unit executes the decryption process of decrypting the encrypted data when the confirming unit confirms the absence of the restriction on the reproduction process.

3. A data protecting method in a portable information terminal with data storing means for storing plaintext data or encrypted data, and right information storing means for storing right information necessary for a decryption process of the encrypted data stored in the data storing means, wherein the right information further includes a separate indication as to whether reproduction of the encrypted data is enabled, for each different data type, the data protecting method comprising:
   a receiving step of receiving, at the portable information terminal, a control signal from an external device through wireless communication over a network;
   an encrypting step of, when the received control signal is an instruction signal to execute an encryption process on plaintext data stored in the data storing means, encrypting, at the portable information terminal, the plaintext data stored in the data storing means, and for storing the encrypted data resulting from the encryption process, in the data storing means;
   a decrypting step of, when the right information including the separate indication for each different data type stored in the right information storing means is valid, with issuance of a reproduction instruction to reproduce the encrypted data stored in the data storing means, executing, at the portable information terminal, the decryption process on the encrypted data stored in the data storing means, using the right information, and, when the right information stored in the right information storing means is invalid, avoiding executing the decryption process on the encrypted data stored in the data storing means, using the right information;
   a reproducing step of reproducing plaintext data resulting from the decryption process in the decrypting step; and
   an authentication step of performing an authentication process through communication with the external device over the network for performing authentication of the portable information terminal, when issuance of the reproduction instruction to reproduce data stored in the data storing means is received which includes an input from a user for searching data stored on the portable information terminal,
   wherein when the portable information terminal receives the reproduction instruction, the decryption process of decrypting the encrypted data stored in the data storing means is performed when the authenticating means determines that the authentication is successfully done and when a data type for the data which the user is searching is enabled for reproduction according to the separate indication for each different data type in the stored right information.

4. A portable information terminal comprising:
   a data storing unit configured to store plaintext data or encrypted data;
   a receiving unit configured to receive a control signal from an external device through wireless communication over a network;
   an encrypting unit configured to, when the control signal received by the receiving unit is an instruction signal to execute an encryption process on plaintext data stored in the data storing unit, encrypt the plaintext data stored in the data storing unit, and to store the encrypted data resulting from the encryption process, in the data storing unit;
   a right information storing unit configured to store right information necessary for a decryption process of the encrypted data stored in the data storing unit, wherein the right information further includes a separate indication as to whether reproduction of the encrypted data is enabled, for each different data type;

a decrypting unit configured to, when the right information including the separate indication for each different data type stored in the right information storing means is valid, with issuance of a reproduction instruction to reproduce the encrypted data stored in the data storing unit, execute the decryption process on the encrypted data stored in the data storing unit, using the right information and to, when the right information stored in the right information storing unit is invalid, avoid executing the decryption process on the encrypted data stored in the data storing unit, using the right information;

a reproducing unit configured to reproduce plaintext data resulting from the decryption process by the decrypting unit; and an authenticating unit configured to perform an authentication process through communication with the external device over the network for performing authentication of the portable information terminal, when issuance of the reproduction instruction to reproduce data stored in the data storing unit is received which includes an input from a user for searching data stored on the portable information terminal, wherein when the portable information terminal receives the reproduction instruction, the decrypting unit executes the decryption process of decrypting the encrypted data stored in the data storing unit when the authenticating unit determines that the authentication is successfully done and when a data type for the data which the user is searching is enabled for reproduction according to the separate indication for each different data type in the stored right information.

* * * * *